April 5, 1960

A. R. GOW ET AL 2,931,653

FOOTBALLS HAVING A SECURELY GRIPPABLE LACELESS SURFACE

Filed Aug. 2, 1956

INVENTORS
A. R. Gow
P. S. Madsen

BY Rockwell & Bartholow

ATTORNEYS

April 5, 1960   A. R. GOW ET AL   2,931,653
FOOTBALLS HAVING A SECURELY GRIPPABLE LACELESS SURFACE
Filed Aug. 2, 1956   2 Sheets-Sheet 2
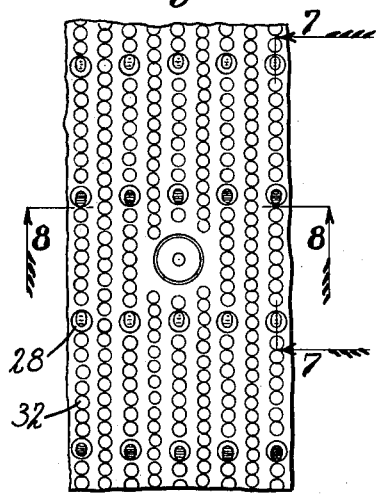
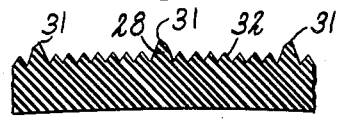
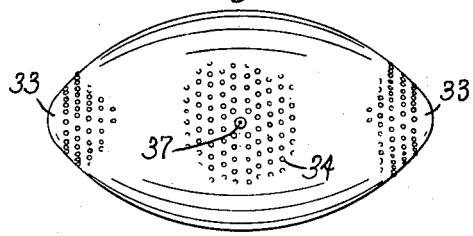
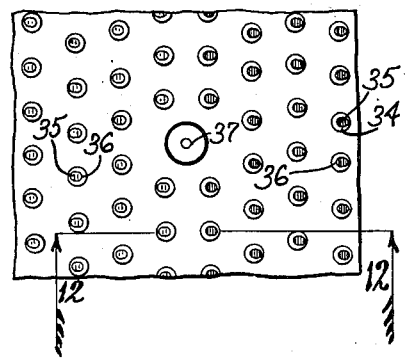
INVENTORS
A. R. Gow
P. S. Madsen
BY
ATTORNEYS

United States Patent Office 2,931,653
Patented Apr. 5, 1960

2,931,653

FOOTBALLS HAVING A SECURELY GRIPPABLE LACELESS SURFACE

Arthur R. Gow, Hamden, and Paul S. Madsen, Bethany, Conn., assignors to The Seamless Rubber Company, New Haven, Conn., a corporation of Connecticut Application August 2, 1956, Serial No. 601,809

4 Claims. (Cl. 273—65)

This application is a continuation-in-part of our application Serial No. 301,094, filed July 26, 1952, and now abandoned.

This invention relates to ellipsoidal footballs which are of the so-called carcass type, the wall of the ball being a composite structure including an inflatable valve-equipped bladder and an outer rubber cover, the term rubber being used in a broad sense so as to include rubberlike material as well as natural and synthetic rubber.

The invention deals especially with the means employed for the purpose of enabling the ball to be gripped by the hand of the player.

In the game employing an ellipsoidal ball and involving with other features the execution of passes, the players have been assisted in gripping the ball by the laces commonly used, and also by formations such as longitudinal grooving commonly provided upon the surfaces of footballs. In rubber-covered footballs the laces and the longitudinal grooving of the leather-covered balls have commonly been replaced by imitative elements or features. With rubber-covered balls the players have also had the benefit of such surface roughness as could be provided upon the surface of rubber covers in the nature of pebbling or the like which is imitative of the surface of leather. These features, however, have not provided a satisfactory and effective non-slip surface upon the ball, whether covered with leather or with rubber. The laces are located only at the middle portion of the ball and at only one point in the circumference or ball girth, and it is apparent that for that reason there are many conditions encountered where hand grip against the laces is impossible or ineffective. As regards the longitudinal grooving commonly employed on the ball surface, this is usually characterized by rounded formations longitudinally disposed and only four in number, and these are not of much effect in enhancing the hand grip, especially under some conditions. The roughening of the ball surface in the nature of pebbling provides projections which are rounded and very shallow, and slipping of the hand upon such a surface is of the commonest occurrence.

One of the objects of the invention is to provide a rubber-covered football of ellipsoidal shape with means providing more facile handling and more effective grip upon the ball as it is handled, thrown and caught in playing the game of football as it is now played.

Another object is to provide an ellipsoidal ball which is an improvement upon present balls by reason of the provision of an effective gripping surface which is of large area and of uniform character with respect to different areas of the ball surface and is better suited to the playing conditions.

To these and other ends the invention consists in the novel features and combinations of parts to be hereinafter described and claimed.

In the accompanying drawings:

Fig. 6 is a fragmentary view generally similar to Fig. 3 showing a modified form;

Fig. 7 is a section on line 7—7 of Fig. 6;

Fig. 8 is a section on line 8—8 of Fig. 6;

Fig. 9 is a section on a larger scale of projecting members appearing in Fig. 7;

Fig. 10 is a small scale side elevation of a football illustrating a further modification, the gripping projections in some areas being omitted;

Fig. 11 is a fragmentary view on a larger scale showing a part of the middle area of the ball shown in Fig. 10; and Fig. 12 is a section on line 12—12 of Fig. 11.

Figure 1:
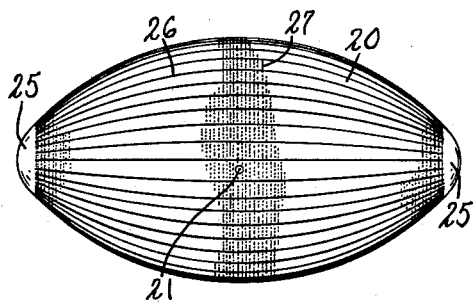
Fig. 1 is a side elevation on a small scale of an ellipsoidal football embodying our improvements, the stud-like projections in some areas of the ball surface being omitted.

In the form shown in Figs. 1 to 5, as well as in other forms herein described, the ball surface is characterized by the provision of projections suitably formed upon the cover layer of rubber as by molding. These members or elements comprise, in this instance, gripping ribs extending lengthwise of the ball, and between the ribs a multiplicity of studs or bosses having comparable height and width. These elements are of such dimensions as to preclude the showing of the complete ball at full scale and to make desirable detail views which are considerably enlarged.

In the form shown in Figs. 1 to 5, there is an ellipsoidal rubber-covered molded football 20 provided at the center of the ball axis with an inflating valve 21. This valve has a stem located in an aperture in the cover, preferably so as to be flush with the ball surface, and this valve is carried by an inflatable rubber bladder 22. The valve may be of the kind shown in the De Laney and Madsen Patent 2,065,120 of December 22, 1936. The rubber cover layer of the ball is indicated at 23 (Fig. 4), and between the bladder and the rubber cover is an intermediate rubber layer 24 which may, if desired, embed a winding of thread or cord (not shown). These layers or similar layers molded together provide the composite wall or carcass of the ball.

The cover 23 may be made of natural rubber or synthetic rubber, or a combination of the two, or of other elastomer or rubber-like material.

The ball herein shown is a laceless football (without real lacing or imitation lacing) in which the surface of the ball is available for carrying effective gripping means which is placed uniformly over the entire ball surface except for the valve and certain small areas 25 adjacent the poles or extreme ends. Here the surface includes spaced apart longitudinal ribs 26, and between these ribs a multiplicity of small studs or bosses 27, molded upon the cover layer. In Fig. 1 the projections 27 located in some areas of the ball surface are omitted, but it is to be understood that the entire surface of the ball except for the valve 21 and the tip areas 25 is preferably supplied with these projections.

Figure 3:
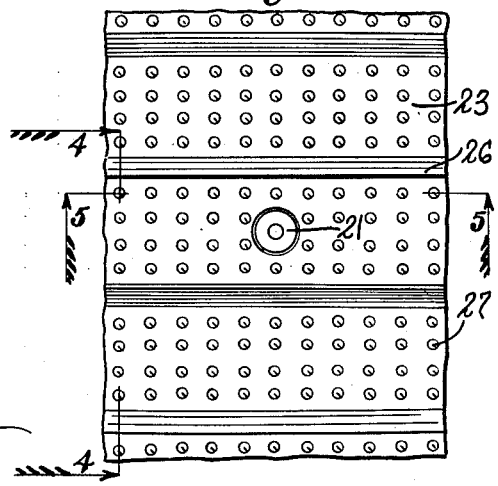
Fig. 3 is a view on a larger scale of a portion of the ball at the middle.
Figure 2:
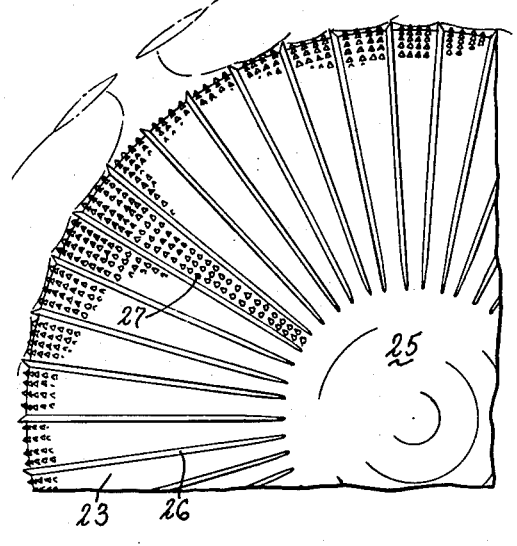
Fig. 2 is a fragmentary view on a larger scale looking toward one end of the ball, the stud-like projections in some areas being omitted.

In this form the stud-like projections 27 are arranged in rows extending transversely of the ball between the ribs 26, as shown in Fig. 3, the rows being separated to provide spaces between them. The ribs 26 in this case provide continuous projections over the entire length of the ball except for the tip areas and each rib is in alignment with the major axis of the ball so that the ribs are spaced apart at maximum distance at the middle of the ball and at minimum distance at the ends of the ribs.

Figure 4:
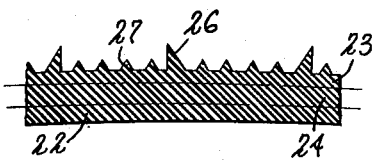
Fig. 4 is a section on line 4—4 of Fig. 3.
Figure 5:
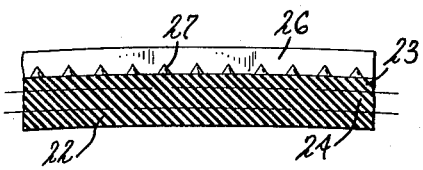
Fig. 5 is a section on line 5—5 of Fig. 3.

In the form shown, the ball surface is provided with some forty-six ribs evenly spaced throughout the girth, the spaces between the ribs being about 3/8 of an inch at the center and about 1/8 inch at the ends of the ribs. The rib cross section or profile is angular, as shown in Fig. 4, tapering from the base to a sharp summit, but it will be noted that while in this case all of the ribs are of the same cross section there is a difference in their placement or orientation. In this example each rib has a face that is upright or substantially normal to the ball surface from which the rib extends, and there is another face at a slope or inclination to the ball surface. This second face may be at an angle of say 30° to the first face. It will now be noted that the ribs are differently oriented and are divided into two groups, each rib having at one side thereof an upright or normal face opposed to a similar rib face and having at the opposite side thereof a sloping face opposed to a similar face of another rib. The result of this arrangement is that valleys formed on the ball surface by the ribs alternate as to the character of the side faces, a valley having upright faces at both sides alternating with a valley having sloping faces.

As far as dimensions are concerned, these ribs may have, for example, a height of 3/32 of an inch and a width of 3/64 of an inch.

Reverting now to the studs or bosses 27, which are arranged in transverse rows, these members are of conical formation presenting points at the summits and are spaced from each other in a direction transversely to the ball axis. Their height is substantially equal to their base width, the height of these members being substantially less than that of the ribs 26. These conical projections may have a height and a base diameter of say 3/64 of an inch, and the spaces between one projection and the next one in the same row may be say 3/64 of an inch and the distance between transverse rows of these projections may be 1/16 inch. It is also to be noted that in this form of the ball the conical projections are in rows substantially in line with the major axis of the ball although, as the valley or depression between adjacent ribs narrows (Fig. 2), the number of cones placed in the valley is decreased.

The studs or projections 27, located and arranged in the manner above described, provide effective means for interlocking the ball surface with the surface of a hand grasping the ball. A finger, thumb or palm of a player's hand applied to the ball may engage the relatively sharp summits of these projections in the spaces between the ribs so that the projections indent the overlying surface, and the surface of the hand may be engaged in spaces between these projections so as to obtain a better interlocking effect. The ribs 26 also indent the hand surface to a certain extent and increase the security of the grip, and a hand surface applied to a number of the ribs will extend into the valleys or recesses between the ribs and engage effectively the projections there provided.

By providing ribs 26 divided into two groups, as above described, so that girthwise of the ball the ribs of one orientation alternate with those of the other orientation, a novel beneficial result is achieved leading toward more secure grip of the ball in play by engagement of a hand surface with a number of the ribs. It is understood, of course, that in gripping the ball provided with a multiplicity of ribs, as above described, a plurality of ribs will be engaged by a finger and a plurality of ribs will be engaged by the palm of the hand. To give an example of the effect produced, let it be supposed that a finger of a player's hand grasping the ball at the side from beneath takes a position as shown at the upper part of Fig. 2 with the finger directed in a counterclockwise direction. Such a finger will engage a substantial number of ribs and the ribs will have a different effect depending on the disposition of their side faces or surfaces. Where the upright or normal face of the rib is to the left (Fig. 2) the finger surfaces engaging these ribs in the manner shown by the broken lines will have such engagement as to resist turning movement of the ball relatively to the hand in a counterclockwise direction. A number of the ribs so arranged will, in the aggregate, effectively inhibit slipping of the ball in this sense, not only by finger engagement but by palm engagement. The other ribs engaged by the same finger will also have some effect in enhancing the grip but it will be notably less than that of the first-mentioned ribs. Where the player's finger (and hand) are directed oppositely, as shown by the broken lines at the lower part of Fig. 2, the ribs which will be most effectively engaged will be those whose upright or normal face is disposed oppositely to the group of ribs mentioned above, i.e., faced in a clockwise direction. Thus it will be understood that the very effective inhibition of turning or rotating of the ball relatively to the hand is obtained whether the player's hand is extended around the ball in one direction or the other. It should also be understood that for this beneficial result it is not necessary for the hand or finger to extend across the major axis of the ball at a right angle to the axis, because it will be evident that a beneficial effect will be had when the grasping hand with spread apart fingers and thumb is disposed at any of various angles to the axis; and even when the ball is gripped by one hand from the extreme end, one or more fingers will be disposed crosswise or intersectingly of the ribs in a manner to bring about enhanced resistance to relative turning of the ball and hand.

In the form shown in Figs. 6 to 9, conical stud members are arranged in valleys or corridors between upstanding, elongated members or formations arranged in groups and comprising differently oriented elements serving purposes similar to those of the ribs 26. However, in this case the elongated formations arranged longitudinally of the ball instead of being continuous are composed of individual stud-like members spaced apart and arranged in rows. Here the elongated formations comprise stud-like members 28 disposed in planes passing through the major axis of the ball. These members are in the nature of cones slabbed off at their upper ends to provide a flat surface at an acute angle to the axis of the projection. One of these projections is shown in Fig. 9, where the body of the conical part is indicated at 29 and the inclined upper surface at 30. At the upper part of the surface 30 is a ridge or edge 31, and the incline 30 extending downward from ridge 31 corresponds in a general way to the downwardly inclined surface of the previously described rib 26. The projections 28 are arranged in rows so that the inclined surfaces 30 of a given row slope transversely of the ball in the same direction, and the elongated formations alternate in their orientation so as to obtain generally the same effect in securing the ball against displacement when the hand is placed on the ball in different positions. The optimum inhibition against displacement of the ball in a given direction occurs when the finger—or other hand surface—is directed upwardly over the surface 30 so as to catch on the edge 31, and with reference to Fig. 9 this will inhibit displacement of the projection 28 in a leftward direction. The inclination of surface 30 to the projection axis is considerably greater than that of the side surface of the projection body 29.

In this form, stud-like projections 32 are disposed in rows extending across the valleys or depressed portions between the rows of the larger studs or projections 28, and studs 32 may be in the form of cones, as in the form first described, but here these cones are placed close together in a transverse row without intervening spaces. They are preferably about half the size of cones 28. Where there are say seven studs 32 between the rows of larger projections at the middle of the ball, the number will be reduced gradually in the direction of the ball tip as required by the convergence of the longitudinal formations. In this particular form there are transverse rows of small projections in line with larger projections 28, with continuous lines or rows of small projections intervening, as shown in Fig. 6. These continuous lines cross the lines of larger projections, as shown in that view. The area of the gripping surface of this second form is the same as in the form of Figs. 1 to 5.

In the modified form shown in Figs. 10 to 12, projections similar to the projections 28 are arranged on the ball surface in transverse lines or rows and divided into two groups so as to inhibit displacement of the ball with respect to the hand in different directions. Here the rubber cover layer of the ball, except for the area of the inflating valve 37 and the pole areas 33, is provided with transverse laterally spaced rows of projections 34 similar to the projections 28 above described. These projections have upwardly inclined surfaces 35 similar to the surfaces 30. The effect, as before, is to provide the generally conical projection with a ridge or edge 36 at the summit which will somewhat indent the surface of a grasping hand and act to inhibit displacement of the ball in one direction relatively to the hand. These projections are divided into two groups, the groups being at the respective sides of the centers of the major axis of the ball, each group having its ridges 36 turned toward the center of the ball, as shown in Figs. 11 and 12. This arrangement of the projections on the ball surface will enhance the security of the grip of a hand applied to the ball in different locations and in different ways, but in addition to this there is secured very effective inhibition of the displacement of the ball when it is grasped by one hand at or near one end of the ball. When the ball is so grasped the orientation of the slabbed off cone members at that end of the ball will be such as to provide firm resistance against expelling of the ball as it is being grasped.

As appears from Fig. 11, the inflating valve 37 is placed between projection rows nearest the center of the major axis, and it is understood that all of the projections at one side of the center have one orientation and all at the opposite side have the other orientation, these projections being in transverse row-like formations extending around the ball girth at different points or zones in the ball length.

In the two first forms and in the present form or modification, the row-like formation, whether continuous or interrupted, has an inclined face or faces at one side differing from the profile at the opposite face so as to achieve the purposes above mentioned. In all of these forms the said formations are in rows or substantially straight lines having a non-acutely-angled relationship to the major axis of the ball.

For college games the football should be of the form and dimensions which are official. The curve of the ball side in the longitudinal direction for the greater part of the ball length has a radius which is relatively large and near the pole or tip of the ball this curve merges into one drawn on a smaller radius. The gripping surface on the ball should extend continuously beyond the center of the ball and at its ends it should be close to or only slightly centerward of the zone where this change of curvature occurs. This gripping surface it is understood is continuous and uniform throughout the ball girth except for the small pole areas above mentioned. It is important to provide a good grip especially when the ball is gripped wholly in the end region or mostly in the end region. The act of grasping a ball of this type at the end tends to expel the ball from the grasp. By the present invention this tendency is effectively counteracted or inhibited.

As regards the dimensions and spacing of these stud-like projections, as shown in Figs. 10, 11 and 12, it should be noted that, if desired, these projections may be of substantially larger size than the corresponding projections 28 employed in the second form and may be spaced from each other at substantially larger intervals than in the second form (Figs. 6 to 9).

It is obvious that in holding the ball in both hands, with the hands against opposite side portions of the ball, a large hand-interlocking area of the ball will be contacted, and under such conditions the ball can be very securely gripped and locked so that it cannot be dislodged easily. It will also be apparent that, in carrying the ball and in catching or receiving the ball on a kick or pass, the holding effect is greatly increased in comparison to prior balls of the type mentioned in the introductory part of this specification. In passing or throwing, the ball may be grasped effectively nearer the end than would be the case with prior art balls, having the thumb at one side and the fingers at the opposite side, under which conditions the projections of substantial height and of hand-interlocking contour, and spaced apart to provide areas into which the hand surfaces project for holding purposes, greatly enhance the security of the grip. It is desired by many players to execute passes by holding the small-diametered portion of the ball, and this condition is met admirably when the ball structure is of the kind described. Under a large number of different conditions the enhanced gripping effect upon the ball made possible by the present construction is very advantageous.

While the absence of lacing from the surface of an athletic ball is not new, the elimination of lacing in the present instance was an important first step. There are many conditions under which the customary lacing on ellipsoidal footballs causes trouble in football games. The lacing is, in many ways, an obstacle or obstruction rather than a help. In kicking it is a distinct detriment and before kicking the ball is oriented so that the lacing will not be in the way. However, this is not the only objection to the lacing for it interferes seriously with the handling of the ball by a number of players on the team. With the conventional ball, the players in endeavoring to secure a good grip or good control of the ball rely on the lacing as providing the most eligible gripping means with which the ball is provided. In the present game of football the center, quarterback, ball carrier, passer, punter and receiver all need to have effective control of the ball but the lacing plays them false not only as regards fumbles but in many other ways. The new gripping provisions of the present ball are not a substitute for the customary lacing, but are distributed over substantially the entire area of the ball surface so that effective grip is provided which is uniform and continuous in the ball girth at the middle of the ball and in zones or areas quite near the ball tips. There is an effective grip provided when the ball is grasped at the middle and when it is grasped at the ends. In other words, the grip is available wherever the hand is placed. Moreover, the ball can be held at one end by one hand only by reason of the expelling-inhibiting grip that is provided, and this is of advantage because in football as it is now played, it is desirable under many conditions to handle the end portion of the ball rather than the middle, especially in pitchouts.

While the stud-like protuberances on the ball surface, as above described, have what may appear to be small or even minute dimensions, they are not to be confused with the customary pebbling used on the surfaces of ellipsoidal footballs and round basketballs. In the commonly used pebbling, the "pebble" has a height of about 10/1000 of an inch and a diameter of about 1/16 inch, viz., about 62½/1000. The height is very minute and the diameter many times the height; and, moreover, the very shallow "pebbles" are set very close together, the spacing being so slight as to prevent surfaces of the hand from entering and interlocking with the ball surface. In the above-described structure, in accordance with the present invention the stud or protuberance, besides having a definite sharp profile whereby it interlocks with the hand, presents a projection in which the height is much greater than ordinary pebbling and the width instead of being many times the height as in ordinary pebbling approximates the height; and further, there is the factor of spacing and of predetermined arrangement on the ball as above described. Moreover, in the second form above described and in the third form, where slabbed off cones are used which are considerably larger than the cones or studs used in the valleys, the difference over ordinary pebbling is even more manifest.

It will be seen, therefore, that, while the described surface formation and ball structure is not intended as a substitute for football lacing, neither is it a substitute for the pebbling used heretofore on footballs.

In the present case the center, quarterback, ball carrier, passer, punter and receiver have superior control of the ball because there is no "feeling for the laces" as in past practice, and because the grip means is where the hand is and is effective when the ball is gripped in any part of its length and girth. The new ball provides more accurate passes from center because the center has real "ten finger" control, one hand usually being placed at the middle of the ball and the other at one end. The quarterback is more sure of receiving the ball without a fumble, the ball carrier more sure of holding it without dropping. There are fewer blocked kicks because the kicker is surer to catch and hold the ball and does not have to orient the ball before kicking it. The passer has quicker, surer grip and control of the ball, which makes for longer passes, and the pass receiver has more chance of pass completion because the ball is obviously easier to grasp and hold than the conventional ball.

While a number of different forms of the invention are disclosed herein various other forms and modifications may be used without departing from the principles of the invention and the scope of the claims.

What we claim is:

1. An inflatable ellipsoidal football of the carcass type having a composite wall including an inner bladder and an outer rubber cover extending over the entire area of the ball except for the area of an inflation valve, said ball being a laceless football devoid of lacinglike obstruction to the handling of the ball and being provided with a surface which affords a secure grip to facilitate handling and throwing even when the ball is gripped by one hand near the end, said cover layer being provided exteriorly with integral, relatively prominent projections arranged in uniform array, each having a gripping edge formed thereon, said projections being spaced apart so that a plurality thereof will engage a grasping hand, each having at one side a profile differing in slope from that at the opposite side when viewed in cross-section taken on a plane perpendicular to the major axis of the ball, thereby to increase the gripping effect by increasing resistance to ball slippage in a predetermined direction, the slope of about half of said profile surfaces being substantially identical and steeper on one side of the projections and the slope of the remainder of said profile surfaces being substantially identical and steeper on the opposite side of the projections, the similarly sloped projections being intermingled with the others in a predetermined array on the cover of the football so that a grasping hand will encounter a plurality thereof.

2. An inflatable ellipsoidal football as set forth in claim 1 in which the relatively prominent projections are spaced apart laterally to provide intervening valleys or corridors in which less prominent upstanding studs are provided.

3. An inflatable football of the carcass type having a composite wall including an inner bladder and an outer cover extending over the entire area of the ball except for the area of an inflation valve, said ball being a laceless football devoid of lacinglike obstruction to the handling of the ball, said ball being provided with an outer surface affording a secure grip in handling and throwing, said surface being characterized by a plurality of more prominent projections and a plurality of less prominent projections formed integrally with said cover in a uniform array, the more prominent projections extending substantially longitudinally of said football from one end to the other and the less prominent projections being interposed between the more prominent projections, each of said more prominent projections having a longitudinally extending sloped surface formed thereon which terminates in a gripping edge, the surfaces of about half of said prominent projections sloping more steeply in one direction and the surfaces of others sloping more steeply in the opposite direction, the arrangement of the more prominent projections sloped in one direction being intermingled in a predetermined array with the projections sloped in the opposite direction so that a grasping hand will encounter a plurality of each.

4. An inflatable football of the carcass type having a composite wall including an inner bladder and an outer cover extending over the entire area of the ball except for the area of an inflation valve, said ball being a laceless football devoid of lacinglike obstruction to the handling of the ball, said ball being provided with an outer surface affording a secure grip in handling and throwing, said surface being characterized by a plurality of generally longitudinally extending, prominent ribs spaced equally apart so that a finger of a gripping hand of a person handling the ball will engage a plurality thereof, and a uniform array of less prominent projections intermediate adjacent prominent ribs so as to be engaged with less pressure by the portion of the finger between the more prominent ribs, the cross-sectional profile of each rib presenting a more steeply sloped surface and a less steeply sloped surface meeting at a relatively sharp edge, the more steeply sloped surfaces of adjacent ribs being on opposite sides of said ribs, whereby adjacent ribs offer greater resistance to slippage in opposite directions.

References Cited in the file of this patent

UNITED STATES PATENTS

| | | |
|---|---|---|
| 1,543,724 | Roberts | June 30, 1925 |
| 2,011,760 | Gallinant | Aug. 20, 1935 |
| 2,194,674 | Riddell | Mar. 26, 1940 |
| 2,244,503 | Riddell | June 3, 1941 |
| 2,494,806 | Gibson | Jan. 17, 1950 |
| 2,653,818 | Tebbetts et al. | Sept. 29, 1953 |
| 2,859,040 | Gow et al. | Nov. 4, 1958 |